United States Patent
Silverstein et al.

(10) Patent No.: US 11,281,727 B2
(45) Date of Patent: Mar. 22, 2022

(54) METHODS AND SYSTEMS FOR MANAGING VIRTUAL ASSISTANTS IN MULTIPLE DEVICE ENVIRONMENTS BASED ON USER MOVEMENTS

(71) Applicant: INTERNATIONAL BUSINESS MACHINES CORPORATION, Armonk, NY (US)

(72) Inventors: Zachary Silverstein, Austin, TX (US); Robert Grant, Atlanta, GA (US); Ruchika Bengani, Pearland, TX (US); Sarbajit Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 97 days.

(21) Appl. No.: 16/503,172

(22) Filed: Jul. 3, 2019

(65) Prior Publication Data
US 2021/0004414 A1 Jan. 7, 2021

(51) Int. Cl.
G06F 16/9032 (2019.01)
H04W 4/029 (2018.01)
G10L 15/26 (2006.01)

(52) U.S. Cl.
CPC ........ *G06F 16/90332* (2019.01); *G10L 15/26* (2013.01); *H04W 4/029* (2018.02)

(58) Field of Classification Search
None
See application file for complete search history.

(56) References Cited

U.S. PATENT DOCUMENTS

| 9,491,033 | B1 * | 11/2016 | Soyannwo | H04W 4/026 |
| 9,729,821 | B1 * | 8/2017 | Fineberg | H04W 4/029 |
| 10,264,547 | B1 | 4/2019 | Zhong et al. | |
| 10,735,597 | B1 * | 8/2020 | Zagorski | G06T 7/70 |
| 2014/0108013 | A1 * | 4/2014 | Di Cristo | G10L 15/1815 704/254 |
| 2014/0378159 | A1 | 12/2014 | Dolbakian et al. | |

(Continued)

FOREIGN PATENT DOCUMENTS

| CN | 102844738 A | 12/2012 |
| CN | 206402425 U | 8/2017 |

(Continued)

OTHER PUBLICATIONS

Tait M., IPCOM000255231D, Smart Floor in Room Detection, published electronically Sep. 11, 2018, accessed May 8, 2019, 1:21 PM EST (23 Pages).

*Primary Examiner* — Antim G Shah
(74) *Attorney, Agent, or Firm* — Griffiths & Seaton PLLC

(57) ABSTRACT

Embodiments for managing virtual assistants are described. Information associated with a user in an internet of things (IoT) device environment having a plurality of IoT devices is received. A request from the user is received. In response to the receiving of the request, a first portion of a response to the request is caused to be rendered utilizing a first of the plurality of IoT devices. Movement of the user within the IoT device environment is detected. In response to the detecting of the movement of the user, a second portion of the response to the request is caused to be rendered utilizing a second of the plurality of IoT devices based on said detected movement of the user and said received information about the user.

21 Claims, 8 Drawing Sheets

(56) References Cited

U.S. PATENT DOCUMENTS

| | | | |
|---|---|---|---|
| 2015/0010169 A1* | 1/2015 | Popova | H03G 3/20 |
| | | | 381/107 |
| 2015/0128194 A1* | 5/2015 | Kuang | H04N 21/41407 |
| | | | 725/81 |
| 2015/0256954 A1* | 9/2015 | Carlsson | H04R 27/00 |
| | | | 381/59 |
| 2015/0350590 A1* | 12/2015 | Micewicz | H04N 21/4516 |
| | | | 386/230 |
| 2018/0206050 A1 | 7/2018 | Reilly et al. | |
| 2018/0233145 A1 | 8/2018 | Bathiche et al. | |
| 2019/0012902 A1* | 1/2019 | Kumar | H04L 67/26 |

FOREIGN PATENT DOCUMENTS

| | | |
|---|---|---|
| CN | 105161118 B | 1/2018 |
| CN | 105446156 B | 9/2018 |
| WO | 2014113586 A1 | 7/2014 |

* cited by examiner

METHODS AND SYSTEMS FOR MANAGING VIRTUAL ASSISTANTS IN MULTIPLE DEVICE ENVIRONMENTS BASED ON USER MOVEMENTS

BACKGROUND OF THE INVENTION

Field of the Invention

The present invention relates in general to computing systems, and more particularly, to various embodiments for managing virtual assistants in environments with multiple devices based on user movements and/or other activity.

Description of the Related Art

Intelligent virtual assistants (or agents) (IVAs) (or virtual assistants) are computing systems and/or software agents that, for example, perform various tasks or services for users based on given requests or commands (e.g., speech/voice or text-based), perhaps including conducting conversations and answering questions (e.g., chatbots, talkbots, answering question systems, etc.). More generally, the operation of such systems often includes the user providing some form of input (e.g., speaking a command/request), and the system responding by rendering content (e.g., audio and/or visual) using an appropriate computing device (e.g., a mobile electronic device, a stand alone virtual assistant component, an internet of things (IoT) device/appliance, etc.).

In recent years, the implementation of multiple computing devices, IoT devices, etc. in a single user environment (e.g., the user's home) has become increasingly common. When an virtual assistant system is utilized in such an environment, although it may be possible for the system to utilize multiple available devices to render the appropriate response, conventional systems are generally not able to provide a seamless experience to the user without potentially damaging the devices (e.g., by maximizing volume) and/or rendering content in such a way that other individuals in the area also consume (e.g., see, read, listen to, etc.) it even if they do not want to.

SUMMARY OF THE INVENTION

Various embodiments for managing virtual assistants by one or more processors are provided. Information associated with a user in an internet of things (IoT) device environment having a plurality of IoT devices is received. A request from the user is received. In response to the receiving of the request, a first portion of a response to the request is caused to be rendered utilizing a first of the plurality of IoT devices. Movement of the user within the IoT device environment is detected. In response to the detecting of the movement of the user, a second portion of the response to the request is caused to be rendered utilizing a second of the plurality of IoT devices based on said detected movement of the user and said received information about the user.

In addition to the foregoing exemplary embodiment, various other system and computer program product embodiments are provided and supply related advantages. The foregoing Summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
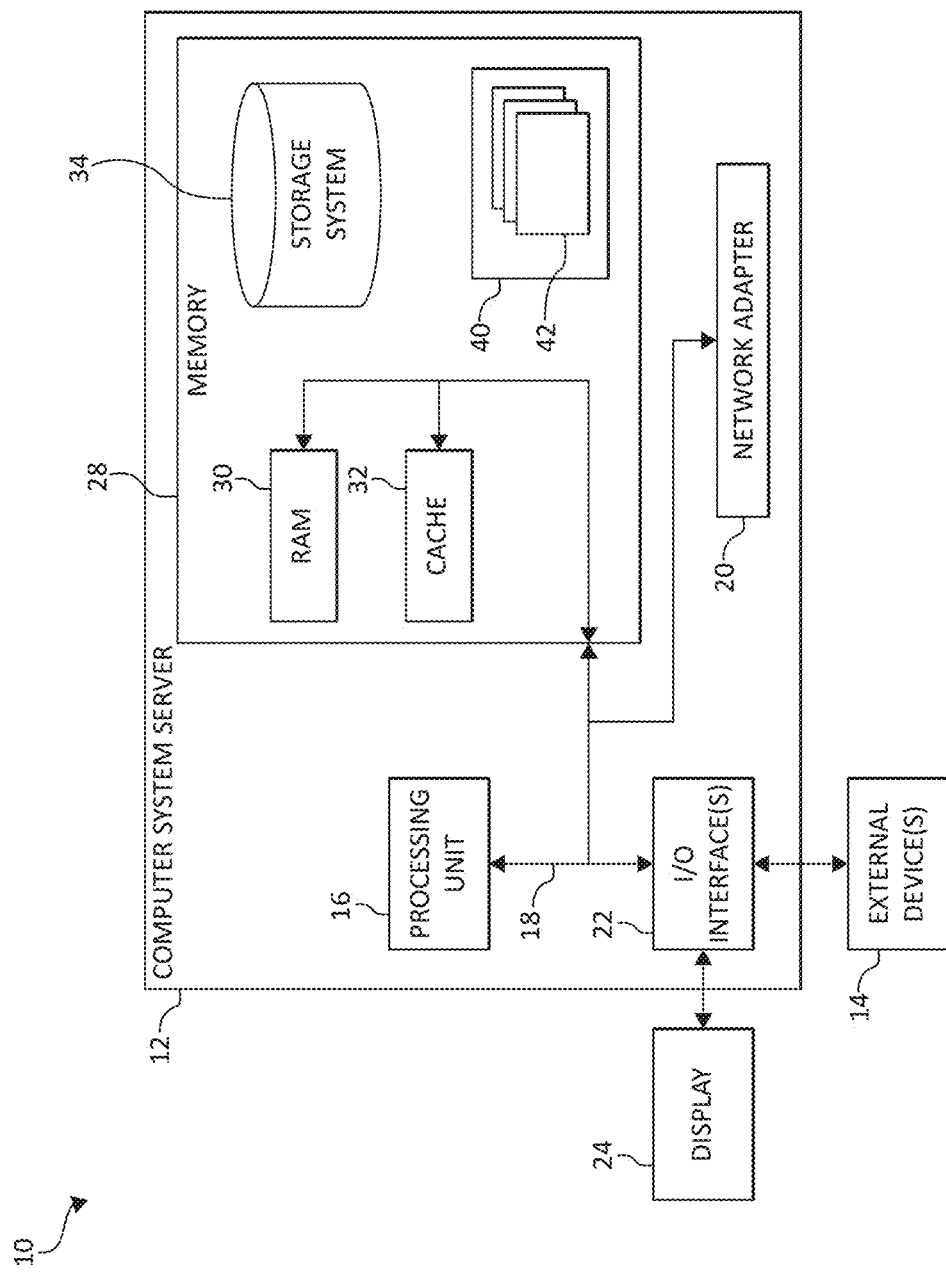
FIG. 1 is a block diagram depicting an exemplary computing node according to an embodiment of the present invention.

As discussed above, intelligent virtual assistants (or agents) (IVAs) (or virtual assistants) are computing systems and/or software agents that can, for example, perform various tasks or services for users based on given requests or commands (e.g., speech/voice or text-based), perhaps including conducting conversations and answering questions (e.g., chatbots, talkbots, answering question systems, etc.). More generally, the operation of such systems often includes the user providing some form of input (e.g., speaking a command/request), and the system responds by rendering content (e.g., audio and/or visual) using an appropriate computing device (e.g., a mobile electronic device, a stand alone virtual assistant component, an internet of things (IoT) device/appliance, etc.).

However, in recent years, the implementation of multiple computing devices, IoT devices, etc. in a single user environment (e.g., the user's home) has become increasingly common. When an virtual assistant system is utilized in such an environment, although it may be possible for the system to utilize multiple available devices to render the appropriate response, conventional systems are generally not able to provide a seamless experience to the user without potentially damaging the devices (e.g., by maximizing volume) and/or rendering content in such a way that other individuals in the area also consume (e.g., see, read, listen to, etc.) it even if they do not want to.

For example, consider a scenario in which a user utilizes a virtual assistant in their home, which has various types of computing devices (and/or IoT devices) located in various parts of the environment. When in their living room, the user may provide a request to a stand alone virtual assistant device to have the news (or information about current events) rendered. In response, the system may begin to render the appropriate content utilizing a television and/or sound system in the living room. After the content has begun, the user then walks out of the living room, towards the other end of their home, and into their bedroom. If the system is able to detect the movement of the user, in order to allow the user to continue to consume the content, the system may, for example, increase the volume. However, as mentioned above, in order for the user to still be able to hear the content, the volume may have to be increased to such a point that damaging the device is a concern.

Alternatively, if the environment has other devices that are appropriately equipped (e.g., with speakers, display screen, etc.), the system may "hand off" the rendering of the content to other devices (e.g., a laundry machine with a speaker, a stereo in the user's bedroom, etc.) as the user moves from one end of their home to the other. However, the system may not be able to optimize the experience for the user. For example, the available devices may not be already rendering the content as the user approaches them, causing a "break" in the content experience. Additionally, other people in the environment may not want to consume the content and/or the user may consider the content to include sensitive material and may not want other people listening unless they are in the same vicinity.

To address these needs, some embodiments described herein provide methods and systems for managing virtual assistants (or IVAs, chatbots, question answering systems, etc.), such as those deployed in multiple device environments, in such a way to optimize the content consuming experience for the user, and perhaps others individuals in the vicinity. This may be performed by coordinating the operation of the various devices such that the rendering of the response(s) and/or content is jointly performed by more than one device based on, for example, information associated with the user, such as (previous and/or current) movement(s) of the user(s) and/or activity of the user(s) in the vicinity, as well as other information (e.g., a schedule, interests, etc.).

For example, in some embodiments, operation of the system is based, at least in part, on information associated with the user (e.g., the individual providing the request, command, query, etc.), such as previous movements and/or previous activity within the environment. For example, the user's (or users') movement and/or other activity within the environment may be monitored over time to, for example, develop a device usage and/or movement/mobility pattern (or model) via a cognitive analysis. The model, perhaps in combination with current movements/activity of the user and/or other information about the user (e.g., a schedule), may be utilized by the system to "predict" the movement(s) of the user after they have provided a request and/or the rendering of (the initial portion) the content has begun.

In this way, the system may be able to optimize the manner in which the response is rendered (e.g., via multiple devices) to the user. However, as described below in greater detail, in some embodiments, the activity of other individuals in the vicinity is monitored (or utilized) such that the content may be selectively rendered in such a way that they may or may not be able to consume the content as well.

In some embodiments, the system detects if the user (i.e., the "primary" user or the user who provided the request) is moving away from a "primary" (or first) device (i.e., the device that detected the request and/or has begun to render the response) while the response is being rendered. In such instances, the system may cause the rendering of the response to be switched to other available devices that coincide the user's movement (or path) and speed to ensure that the continuity of the response is maintained for the user (e.g., the user can see, hear, etc. the content as the user moves through the environment). Such a transfer of the rendering of the content may only be performed if the user's movement and/or information associated with the user indicates that their movement is "substantial" (i.e., they will not be returning to the area of the primary device after a very brief amount of time and/or the distance they are moving is significant enough to the point that other devices should be used to render the content).

In other words, if the system begins to render the response with a first device in a first area (or vicinity, portion, etc.) of the environment (e.g., close to where the user provided the request), and detects that the user is moving towards a second area of the environment that has a second device located therein, the system may transfer the rendering of the response (or at least a second portion thereof) to the second device. Such may be performed not only based on the detected movement of the user while the response it being rendered, but also on previous movements of the user (e.g., the user often moves from the first area of the environment to the second area of the environment when a particular type of content is being rendered, at a particular time(s) on particular a day(s), etc.).

In some embodiments, if the user is listening to an audio (or aural, audible, etc.) response while moving, and is detected as looking at (or turning towards) a device with a display screen (e.g., a mobile phone, television, appliance with a display, etc.), the system may determine that the user would like to view visual content that is associated with the audio response (e.g., video, images, etc.). In response, the system may cause the appropriate visual content to be rendered by the appropriate device (e.g., a device in the direction of the user's gaze).

In some embodiments, if multiple individuals (i.e., the user who provided the request and at least one other individual) are detected as being in the vicinity in which the response is being rendered, and the system detects that at least one of them moving away from the vicinity as the response is being rendered, the system may selectively cause a subsequent portion of the response to be rendered in such a way that at least some of the other individuals are still able to consume (e.g., listen to, watch, etc.) the content, or are not able to consume it, depending on the circumstances.

For example, if the system determines that an individual is moving from their initial location (i.e., their location when the response began) because they do not want to watch, listen to, etc. the content (e.g., based on historical learning), the system may not hand off rendering of the content to other devices along that individual's movement path. However, if the system determines that the individual is interested in the content (e.g., based on contextual situation, gaze, a delay before moving, the cessation of another activity, profile information, etc.), the system may cause the response to rendered in such a way that the individual is able to consume it as they move through the environment (e.g., handing of content rendering to other devices along the individual's path).

In some embodiments, the volume of audio content rendered by individual devices is adjusted as the user (and/or other individuals) move through the environment. For example, as a user begins to move away from the first (or primary) device (i.e., the device that renders the initial/first portion of the response), the volume at which that portion of the response is rendered may be increased so that the user may still hear it. Similarly, in some embodiments, when the rendering of the response is transferred to another (i.e., second, third, etc.) device while the user is relatively far from that device, the volume on the other day may initially be set relatively high and be decreased as the user moves towards it. Such functionality, as well as other features described herein, may be implemented utilizing the relative positions of the devices within the environment (e.g., determined via GPS, wireless communication methods, cameras, microphones/speakers, etc.) and historical learning (and/or feedback/input provided by users).

In some embodiments, the system analyzes user behavior, movements, mobility pattern, reactions, viewing (or gaze), etc. to sequence the individual portions of the response (or content). For example, if the content includes video portions, and at a particular point in time, the user is not near (and/or within line of sight) a device with display capabilities, the rendering of the video portions of the content may be delayed until the user is near (or predicted to be near) a suitable device (e.g., a television).

In some embodiments, a cognitive analysis or machine learning technique may be utilized to perform at least some aspects of functionality described herein. The cognitive analysis may utilize various types of information associated with users (e.g., the user who provides the request and/or other user/individuals) such as pervious movements within the environment, previous activities within the environment, profile information, and current/detected movements and/or activities (e.g., while a request is provided and/or while the response is being rendered). Some of the information may be collected (or detected) with various types of devices within the environment, such as sensors (e.g., cameras, microphones, etc.) and computing devices (e.g., movements and/or utilization of computing devices, such as mobile phones, tablets, etc.).

In some embodiments, the cognitive analysis includes generating and/or utilizes a cognitive (or user) profile for user(s) (i.e., the user who provides the request and/or other user/individuals) based on, for example, data sources associated with the user(s). Data sources that be use used to generate a cognitive profile for the user(s) may include any appropriate data sources associated with the user that are accessible by the system (perhaps with the permission or authorization of the user). Examples of such data sources include, but are not limited to, computing systems/devices/nodes (e.g., IoT devices) associated with the user, communication sessions and/or the content (or communications) thereof (e.g., phone calls, video calls, text messaging, emails, in person/face-to-face conversations, etc.), a profile of (or basic information about) the user (e.g., job title, place of work, length of time at current position, family role, etc.), a schedule or calendar (i.e., the items listed thereon, time frames, etc.), projects (e.g., past, current, or future work-related projects), location (e.g., previous and/or current location and/or location relative to other users), social media activity (e.g., posts, reactions, comments, groups, etc.), browsing history (e.g., web pages visited), and online purchases. Additionally, as described above, previous movements and/or activities of the user(s), such as those within a particular IoT device environment, may be utilized (e.g., to form/determine a mobility model/pattern for the user(s)).

The cognitive analysis may also include classifying natural language, analyzing tone, and analyzing sentiment (e.g., scanning for keywords, key phrases, etc.) with respect to, for example, communications sent to and/or received/detected by virtual assistants and/or other communications associated with users (e.g., emails, in person conversations, social media activity, etc.). In some embodiments, natural language processing (NLP), Mel-frequency cepstral coefficients (MFCCs), and/or region-based convolutional neural network (R-CNN) pixel mapping (e.g., for images/videos captured by cameras), as are commonly understood, are used. Over time, the methods and systems described herein may determine correlations (or insights) between communications (e.g., voice and/or text-based communications) received by chatbots and data sources associated with the communications, perhaps with feedback provided by the users, that allows for the performance of the system to improve with continued use.

As such, in some embodiments, the methods and/or systems described herein may utilize a "cognitive analysis," "cognitive system," "machine learning," "cognitive modeling," "predictive analytics," and/or "data analytics," as is commonly understood by one skilled in the art. Generally, these processes may include, for example, receiving and/or retrieving multiple sets of inputs, and the associated outputs, of one or more systems and processing the data (e.g., using a computing system and/or processor) to generate or extract models, rules, etc. that correspond to, govern, and/or estimate the operation of the system(s), or with respect to the embodiments described herein, the management of virtual assistant operation as described herein. Utilizing the models, the performance (or operation) of the system (e.g., utilizing/based on new inputs) may be predicted and/or the performance of the system may be optimized by investigating how changes in the input(s) effect the output(s).

It should be understood that as used herein, the term "computing node" (or simply "node") may refer to a computing device, such as a mobile electronic device or a desktop computer, and/or an application, such a virtual assistant, chatbot, an email application, a social media application, a web browser, etc. In other words, as used herein, examples of computing nodes include, for example, computing devices such as mobile phones, tablet devices, desktop computers, or other devices, such as appliances (IoT appliances) that are owned and/or otherwise associated with individuals (or users), and/or various applications that are utilized by the individuals on such computing devices.

It should also be understood that, as alluded to above, the methods and/or systems described herein may be utilized in conjunction with any sort of computing and/or software system that renders content (e.g., audio and/or visual) in response to a request, command, query, etc. received from a user (e.g., via voice/speech, text-based methods, etc.). Such systems may include, for example, virtual assistants, chatbots, question answering systems, and the like. As such, for the purposes of this disclosure, terms such as "virtual assistant," "chatbot," etc. may be used interchangeably.

In particular, in some embodiments, a method for managing virtual assistants by one or more processors is described. Information associated with a user in an internet of things (IoT) device environment having a plurality of IoT devices is received. A request from the user is received. In response to the receiving of the request, a first portion of a response to the request is caused to be rendered utilizing a first of the plurality of IoT devices. Movement of the user within the IoT device environment is detected. In response to the detecting of the movement of the user, a second portion of the response to the request is caused to be rendered utilizing a second of the plurality of IoT devices based on said detected movement of the user and said received information about the user.

The received information about the user may include previous movements of the user within the IoT device environment. The causing of the second portion of the response to be rendered utilizing the second of the plurality of IoT devices may be performed utilizing a cognitive analysis.

The first portion of the response may only be rendered utilizing the first of the plurality of IoT devices. The second portion of the response may only be rendered utilizing the second of the plurality of IoT devices.

The user and a second user may be in a first area of the IoT device environment when the request is received. The detecting of the movement of the user within the IoT device environment may include detecting the user moving from the first area of the IoT device environment to a second area of the IoT device environment. The second portion of the response may be caused to be rendered utilizing the first of the plurality of IoT devices after the detecting of the user moving from the first area of the IoT device environment to the second area of the IoT device environment based on information associated with the second user.

The information associated with the second user may include at least one of detected activity of the second user and detected movement of the second user during at least one of the receiving of the request from the user and the causing of the first portion of the response to be rendered utilizing the first of the plurality of IoT devices.

Whether each of the first portion of the response and the second portion of the response includes audio content, visual content, or a combination thereof may be determined. Each of the first of the plurality of IoT devices and the second of the plurality of IoT devices may be selected to respectively render the first portion of the response and the second portion of the response based on the whether each of the first portion of the response and the second portion of the response includes audio content, visual content, or a combination thereof and characteristics of the first of the plurality of IoT devices and the second of the plurality of IoT devices.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment, such as cellular networks, now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors described herein) is capable of being implemented and/or performing (or causing or enabling) any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, personal computer systems, server computer systems, thin clients, thick clients, hand-held or laptop devices, multiprocessor systems, microprocessor-based systems, set top boxes, programmable consumer electronics, network PCs, mobile electronic devices such as mobile (or cellular and/or smart) phones, personal data assistants (PDAs), tablets, wearable technology devices, laptops, handheld game consoles, portable media players, etc., as well as computing systems in vehicles, such as automobiles, aircraft, watercrafts, etc., and/or any other computing node utilizing a virtual assistant and/or in/through which a virtual assistant may be implemented. However, in some embodiments, some of the components depicted in FIG. 1 may be located in a computing device in, for example, a satellite, such as a Global Position System (GPS) satellite. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
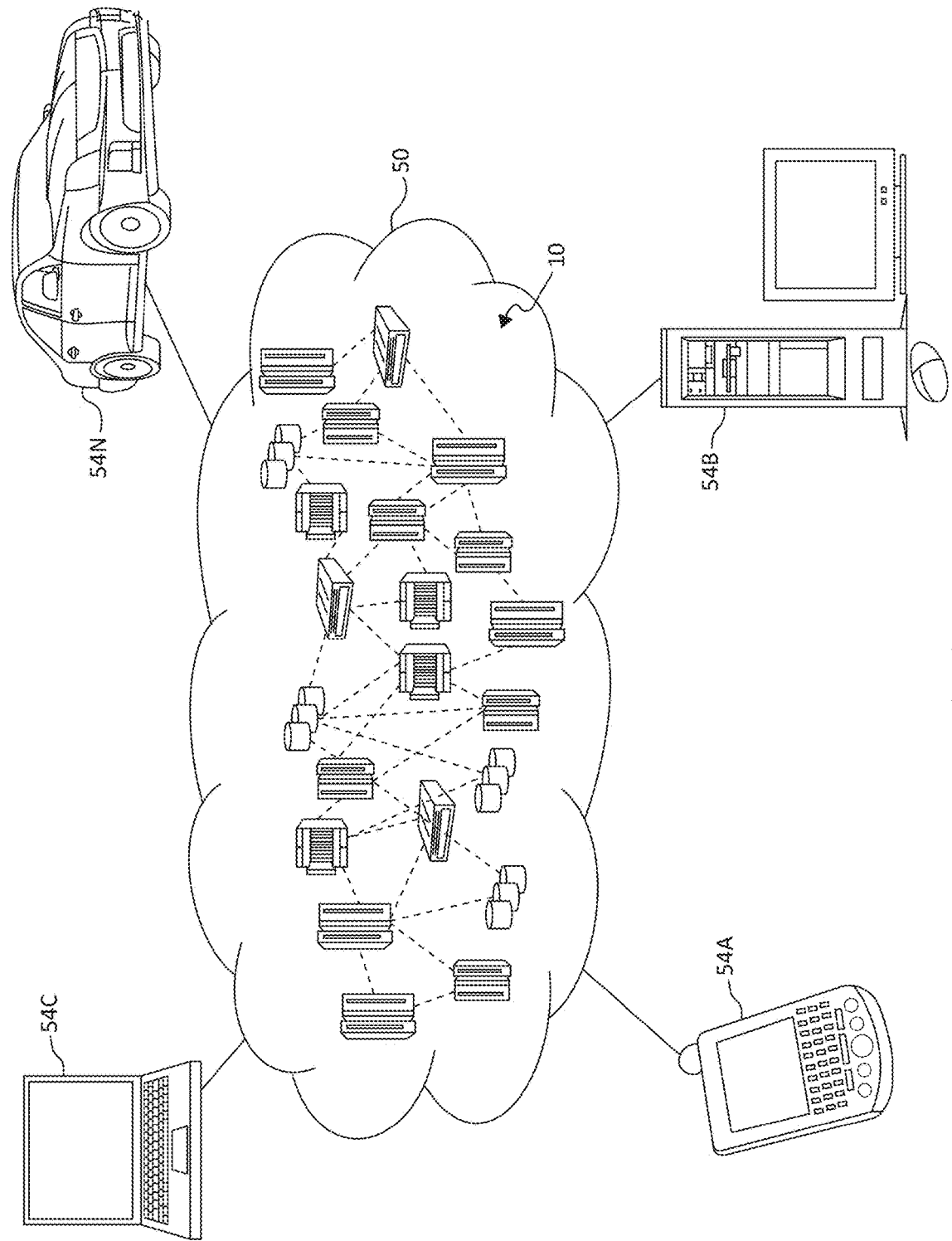
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, cellular (or mobile) telephone or PDA 54A, desktop computer 54B, laptop computer 54C, and vehicular computing system (e.g., integrated within automobiles, aircraft, watercraft, etc.) 54N, may communicate.

Still referring to FIG. 2, nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
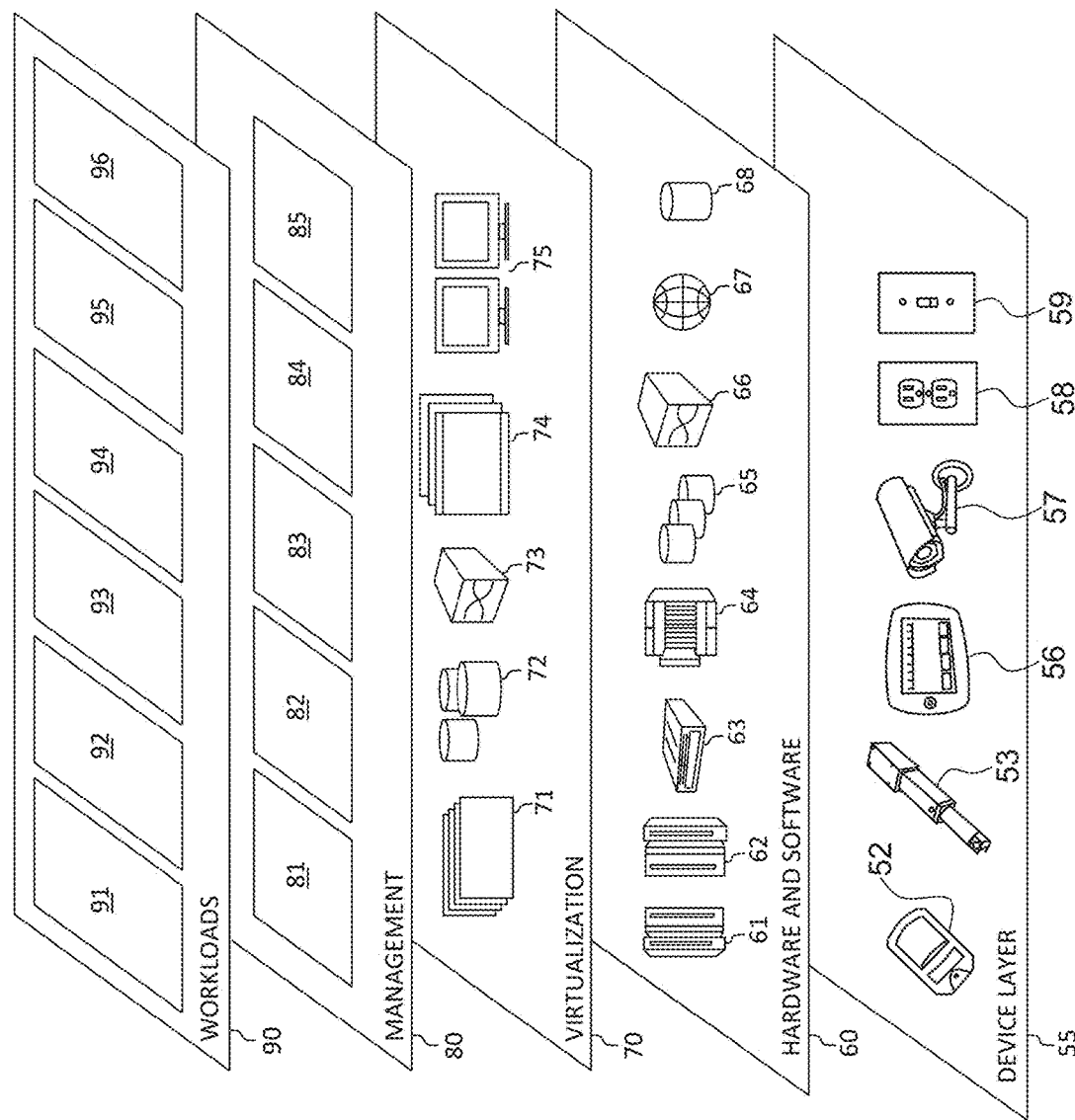
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to, various additional sensor devices, networking devices, electronics devices (such as a remote control device), additional actuator devices, so called "smart" appliances such as a refrigerator, washer/dryer, or air conditioning unit, and a wide variety of other possible interconnected devices/objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for managing virtual assistants (and/or the operation thereof) as described herein. One of ordinary skill in the art will appreciate that the workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, in some embodiments, methods and/or systems for managing virtual assistants (or IVAs, chatbots, question answering systems, etc.), such as those deployed in multiple (or IoT) device environments, in such a way to optimize the content consuming experience for the user, and perhaps others individuals in the vicinity. This may be performed by coordinating the operation of the various devices such that the rendering of the response(s) and/or content is jointly performed by more than one device based on, for example, information associated with the user, such as (previous and/or current) movement(s) of the user(s) and/or activity of the user(s) in the vicinity, as well as other information (e.g., a schedule, interests, etc.).

In some embodiments, available devices within an environment (e.g., a multiple device and/or IoT environment) are identified. The devices may include, for example, various types of computing devices and/or IoT devices, such as smart televisions, desktop computers, mobile devices (e.g., mobile phones, tablets, etc.), laptop computers, sound systems, various types of appliances (e.g., washing machines, refrigerators, etc.), and any other type of "smart" (and/or computing) device that has a speaker (and/or microphone) and/or a display screen (and/or camera). The positions/locations and capabilities or characteristics (e.g., audio and/or video capability) of the devices may also be determined (i.e., statically and/or dynamically). Such a process may be performed manually (e.g., by a user placing markers on a digital map and indicating the capabilities of the various devices) or performed automatically (e.g., via GPS, wireless communications, triangulation, etc.), as will be appreciated by one skilled in the art.

In some embodiments, the system utilizes (or determines) the duration (or length) of responses (or content) to determine the utilization of multiple devices to render the content. For example, if a received request includes a query regarding the current weather in the region, the generated response may only take a few seconds to render. With the rendering of such content taking little time, the system may not transfer the rendering of the content to other devices regardless of the movements, information associated with, etc. the user(s)/individual(s). In contrast, other types of content, such as movies or news reports, may take considerably longer to render. As such, when rendering such content, the system may utilize multiple devices as described herein. Additionally, whether or not multiple devices are utilized may be based on whether or not user movement is determined to exceed one or more threshold.

The system may track user (or other individual) location and attention/gaze, which may be utilized to determine which device(s) should be utilized to render particular types of content. For example, if a user is detected as being (or predicted to be near) and/or gazing towards a particular device, content may be rendered by that device based on the capabilities of the device (e.g., if the device has video capabilities, a video clip may be rendered by the device as opposed to an audio-only content portion).

The system may base the utilization of multiple devices to render content based on users' (and/or other individuals') determined interest. User interest (or lack thereof) may be determined based on profile information (e.g., age, web browsing history, social media activity, etc.) and/or detected activity (e.g., whether or not the individual performs an act/activity that indicates whether or not they are interested in content being rendered and/or moves when the content is being rendered). Various sensors (e.g., cameras, microphones, etc.) and computing devices (e.g., mobile devices) may be utilized to determine user activity and/or location.

In some embodiments, as users (or a user or other individual) move through the environment and/or are predicted to move through the environment, the system identifies the available devices that are in relatively close proximity to the users along with the capabilities of the devices and selects the appropriate devices. The rendering of the content is then orchestrated using multiple devices to provide a seamless content experience (i.e., the ability of users to hear and/or see content is optimized as they move through the environment).

When the system begins to render content (e.g., in response to a received request), the system may determine the presence and/or identity of the individuals (e.g., the primary user and/or other individuals) in the vicinity (e.g., in the same room). Such may be performed utilizing, for example, sensors (e.g., facial and/or voice recognition) and the presence of computing devices (e.g., mobile phones). Previous and current movements, as well as previous and current activity, of the individuals may be utilized to predict movements of the individuals.

The system may orchestrate the rendering of content utilizing multiple devices based on, for example, the predicted movement of individuals, the predicted time spent in different locations (or portions/areas of the environment), the relative positions and capabilities of the available devices, and the interest level of the individuals in the content.

Figure 4:
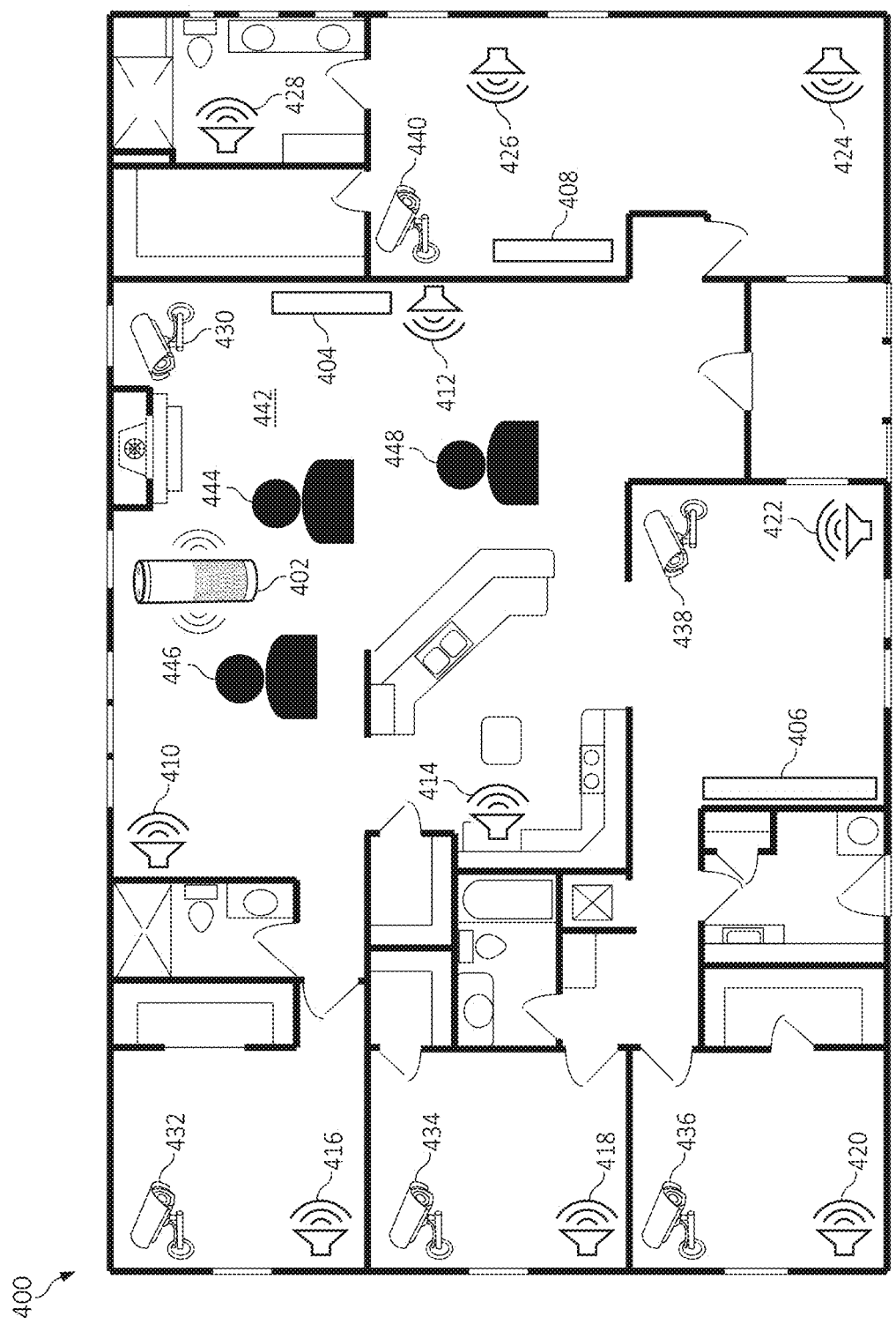
FIG. 4 is a plan view of a exemplary multiple device environment according to an embodiment of the present invention.

FIG. 4 illustrates an exemplary multiple device (or IoT device) environment 400, according to some embodiments described herein. In the example shown, the environment 400 is a home or house with multiple rooms, each of which may be considered to be a unique "area" of the environment 400. The environment 400 includes (and/or has deployed therein) multiple computing (or IoT) devices. In particular, the environment 400 includes a stand alone virtual assistant device 402, display devices 404, 406, and 408, and speakers 410-428. Additionally, the environment 400 includes multiple sensors (or sensor arrays) 430-440.

The virtual assistant device 402 may include any suitable computing device configured to perform virtual assistant (and/or chatbot, question answering, etc.) functionality, as is commonly understood. The display devices 404-408 may include any suitable device (e.g., display screens) suitable for rendering visual content, and the speakers 410-428 may include transducers configured to generate sounds, as is commonly understood. Although the display devices 404-408 and speakers 410-428 are shown as separate components, it should be understood that at least some of such components may be integrated into common devices (e.g., smart televisions, desktop PCs, laptop computers, stereos, IoT appliances, etc.), which may able to perform multiple types of functions. As such, the devices shown in FIG. 4 may be capable of performing functions that are not indicated by the symbols used to represent them (e.g., speaker 414 may be integrated into a refrigerator that also has a display screen).

The sensors 430-440 may include cameras and/or microphones which may be used to monitor activity within the environment 400 (e.g., movements of users/individuals, activities of individuals, etc.). Similar to the display devices 404-408 and the speakers 410-428, the sensors 430-440 may be integrated into various types of devices/systems (e.g., computing devices, appliances, part of a security system, etc.).

In some embodiments, the virtual assistance device 402, the display devices 404-408, the speakers 410-428, and the sensors 430-440 are in operable communication via any suitable communication network (e.g., wireless communication). Additionally, in some embodiments, the virtual assistant 402 (and/or a central control system) determines the locations (or relative locations), as well as the capabilities and/or characteristics, of the various devices within the environment 400 using any suitable method (e.g., GPS, wireless communication, via the sensors 430-440, etc.). However, such information may also be manually provided to the system (e.g., by a user).

Still referring to FIG. 4, in the example shown, multiple users (or individuals) are in a first area 442 of the environment 400 (e.g., a living room) near the virtual assistance device 402 and display device 404. In particular, the users include a primary user 444 and secondary users (or other individuals) 446 and 448.

As one exemplary scenario, assume that the primary user 444 provides a request (e.g., via voice/speech) to the virtual assistant 402 have a particular type of content (e.g., the daily news) rendered while the primary user 444 and the secondary users 446 and 448 are in the first area 442. Given the location of the primary user 44, which may be determined using, for example, at least some of the sensors 430-440, the system (e.g., the virtual assistant 402) begins to render the content utilizing display device 404 and/or speaker 412. In particular, a first (or initial) portion of the content may be rendered by display device 404 and/or speaker 412 while the primary user 444 and the other individuals 446 and 448 are in the first area 442 of the environment 400.

Figure 5:
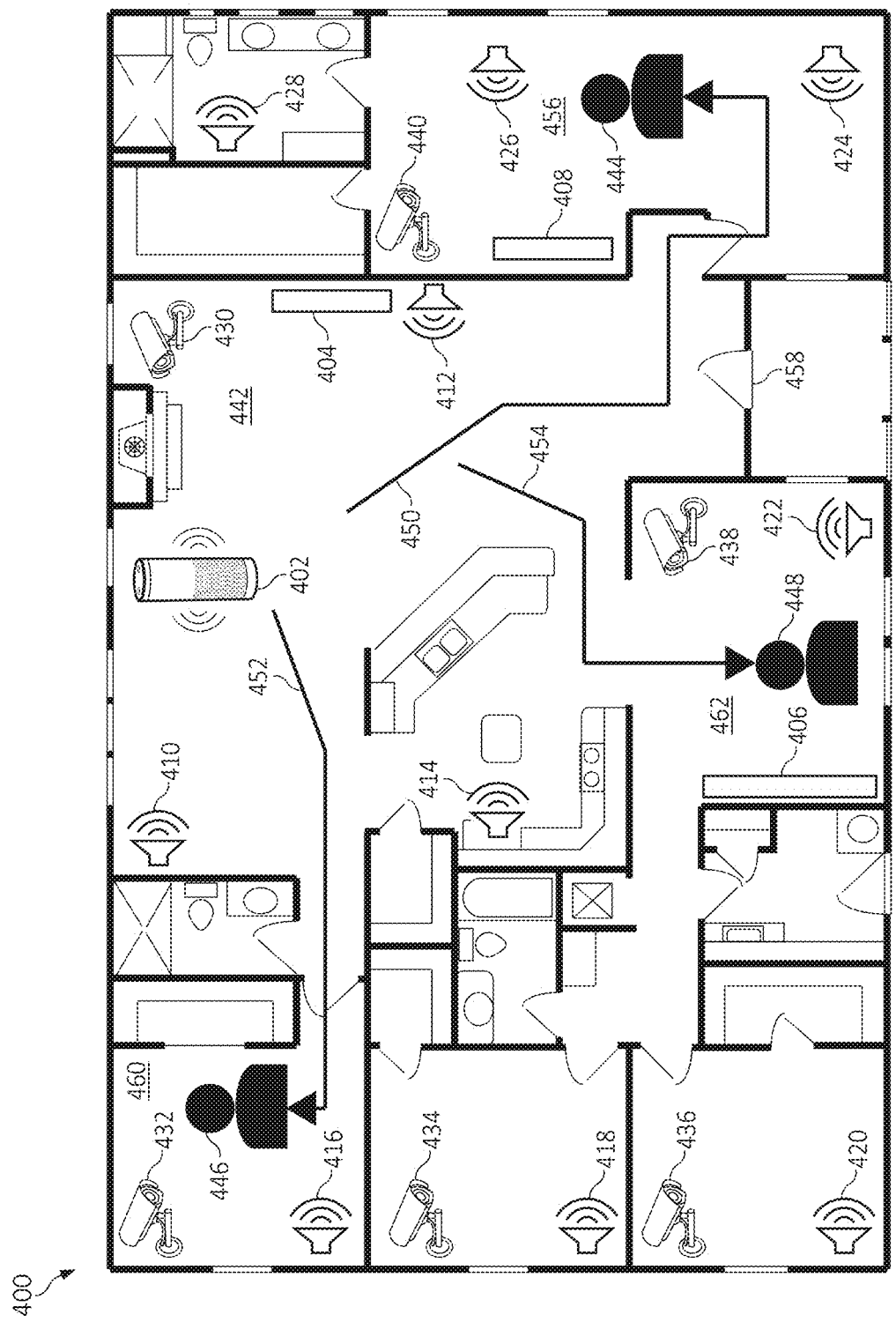
FIGS. 5 and 6 are plan views of the multiple device environment of FIG. 4 illustrating movements of individuals therein.

Referring now to FIG. 5, while the content is being rendered by display device 404 and/or speaker 412, the users 444-448 move from the first area 442 to other areas of the environment (e.g., as detected via one or more of the sensors 430-440, movement of mobile devices detected via wireless communication, etc.) along paths 450, 452, and 454, respectively. In some embodiments described herein, various types of information about the users 444-448 is utilized to determine if the rendering of the content should be orchestrated such that it "follows" the users 444-448 as the users 444-448 move through the environment 400, as well as which of the available devices (e.g., display devices and speakers) should be utilized to perform such rendering. It should be noted that although all three users 444-448 are shown as having moved in FIG. 5, the users 444-448 may move at different times (e.g., the primary user 444 may move before the secondary users 446 and 448 or vice versa).

However, as one example, assume that the primary user 444 moves to a second area 456 of the environment 400 along path 450 before secondary users 446 and 448 move from the first area 442. In some embodiments, when the primary user 444 begins to move in the general direction of the second area 456 (e.g., the portion of the environment 400 just below the first area 442 in FIG. 5), the system utilizes, for example, previous movements, a schedule, etc. of the primary user 444 within the environment 400 to "predict" where the primary user 444 is going to move and, if appropriate, transfer the rendering of the content (or response) to appropriate devices, such as display device 408, speakers 424, and/or speaker 426.

For example, if the primary user's previous movements within (and/or utilization of) the environment 400 indicates that the primary user 444 "often" (and/or frequently at a particular time of day, on certain days, etc.) provides a request for content from the first area 442 and then moves to the second area 456 for a substantial amount of time (e.g., while lying in bed to take a nap), the system may cause the content (e.g., a subsequent or second portion of the content) to be rendered by devices in the second area 456 (e.g., display device 408) as the primary user approaches the second area 456. As a result, the primary user 444 may be provided with a relatively "seamless" or "uninterrupted" content experience, as the content may be already being rendered in the second area 456 as the primary user 456 enters the second area 456.

In contrast, if the previous movements, for example, of the primary user 444 indicate that the primary user 444 is going to leave the first area 442 only briefly and then return, the system may not cause the rendering of the content to be transferred to other devices. For example, the user's previous movements may indicate that the user (e.g., perhaps at a particular time of day) often provides a request for content from the first area 442, briefly goes to a front door (or entry way) 458 of the environment 400, along a path similar to a portion of path 450 to, for example, collect mail, put keys in a particular spot, check to make sure a front door 458 is locked, etc., and then returns to the first area 442, the system may continue to render the content using only devices in the first area 442. However, in some embodiments, perhaps depending on the present of other individuals (e.g., secondary users 446 and 448), the system may cause the volume of the rendering of the content by devices in the first area 442 to be briefly increased (e.g., only to an extent to which there is no concern about damaging the devices), before lowering the volume when the primary user 444 returns to the first area 442.

As described above, the operation of the system (or more particularly, the rendering of content performed by various devices) is (also) based on the presence of and/or information associated with the secondary users 446 and 448. For example, depending on various factors, the content may be rendered in such a way that the secondary users 446 and 448 may also be able to consume (e.g., listen to, watch, etc.) the content regardless of whether or not the secondary users 446 and 448 move from the first area 442.

For example, still referring to FIG. 5, assume both the primary user 444 and secondary user 448 have left the first area 442 (e.g., secondary user 448 has moved along path 454), but secondary user 446 is still in the first area 442 (e.g., as detected via the sensors 410-430, wireless communications, etc.). The system may or may not determine to continue rendering the content in the first area 442 depending on information associated with secondary user 446, such as activity of secondary user 446 and/or profile information of the secondary user 446. For example, if secondary user 446 is detected as performing an activity or act that indicates that secondary user 446 desires to consume the content (e.g., gazing towards display device 404, moving into a position closer to display device 404, looking up from/putting down a magazine, etc.) and/or profile information indicates that secondary user 446 may be interested in the subject matter of the content, the content may continue to be rendered in the first area 442. In contrast, if secondary user is detected as, for example, picking up a magazine, beginning to utilize a mobile device (e.g., to browse the Internet), putting on headphones, etc., such may be considered to indicate that secondary user 446 does not want to consume the content, and the rendering of the content in the first area 442 may be ceased.

Continuing with this example, in some embodiments, if secondary user 446 then moves from the first area 442, depending on whether or not it is determined that secondary user 446 desires to consume the content, the system may orchestrate the rendering of the content to "follow" secondary user 446. For example, as shown in FIG. 5, secondary user 446 has moved into a third area 460 of the environment 400 along path 452. If the system determines that secondary user 446 desires to consume the content, speaker 416 may be utilized. It should be noted that as secondary user 446 moves past speaker 410, speaker 410 may be utilized as an "intermediate" device to render the content to provide a more seamless content experience to user 446. Such functionality (i.e., the use of intermediate devices to render content) may be performed for any users/individuals as they moved through the environment 400.

Still referring to FIG. 5, the system may similarly control the rendering of the content by the available devices based on information associated with and/or activity of user 448. For example, as shown in FIG. 5, if the system determines that user 448 desires to consume the content, and user 448 moves to a fourth area 462 of the environment 400, the rendering of the content for user 448 may be continued using display device 406 and/or speaker 422.

Figure 6:
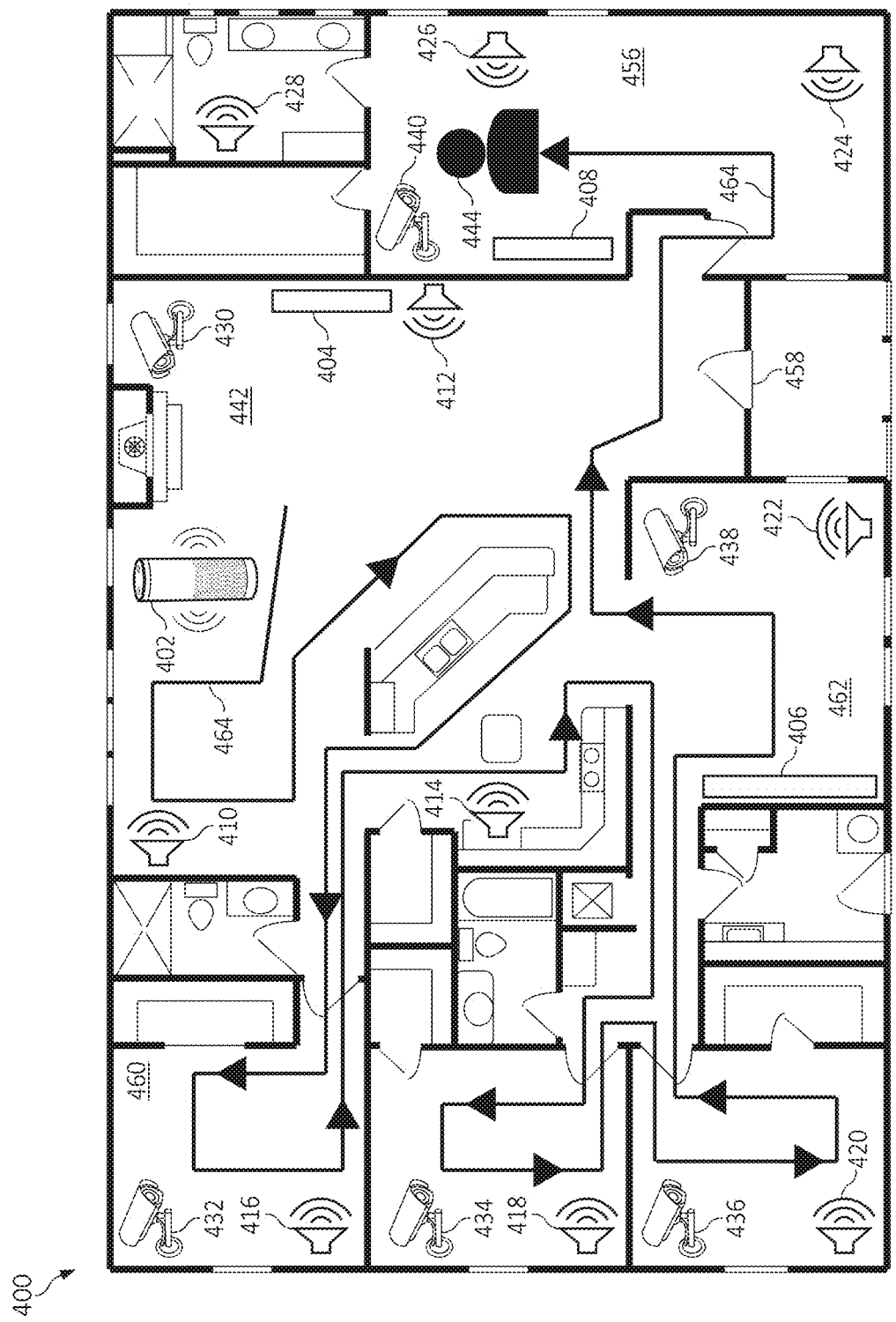

Referring now to FIG. 6, the environment 400 is again shown, with only a single user/individual, in particular, the primary user 444. Again assume that the primary user 444 has provided a request to render content from the first area 442 (e.g., via voice/speech command). After the rendering of the content has begun, the primary user 444 begins to move throughout the environment, as indicated by path 464, ending in the second area 456. Such a path may be indicative of, for example, the primary user 444 performing cleaning duties in the environment 400, checking to make sure lights, etc. are turned off, windows are closed, etc., and may be predicted/indicated by previous movements, etc. of the primary user 444. For example, perhaps the system has determined that the primary user 444 moves throughout the environment in such a way on particular days of the week/month, perhaps at particular times (e.g., to clean the environment).

In some embodiments, as the primary user 444 moves along path 464, the rendering of the content is orchestrated using the available devices to provide a relatively seamless experience for the primary user 444. For example, as the primary user 444 moves near speaker 414 (e.g., in a kitchen area), speaker 414 may be utilized to render content (or a portion of the response generated by the system). Additionally, as the primary user 444 is detected as beginning to move away from speaker 414, the system may predict that the primary user 444 is going to move into the third area 460 of the environment 400. As such, the system may begin to render content with speaker 416 before the primary user 444 has entered the third area 460.

It should be noted that in some instances, content may be rendered by multiple sets of devices at the same time. For example, as the primary user 444 moves from the first area 442 of the environment 400 to near speaker 414, both devices in the first area 442 and speaker 414 may be utilized to simultaneously render at least some of the content. In other words, there may be some "overlap" in the utilization of multiple devices to ensure the user is provided with a seamless experience.

Additionally, based on previous movements of the primary user 444, the user may predict how long the primary user 444 is going to remain in particular portions of the environment 400. Such may be used to determine whether or not the content should be rendered in particular areas. For example, if the primary user 444 is typically only in the third area 460 for a very brief time (e.g., less than 10 seconds), the system may not cause the content to be rendered in the third area 460.

Further, the system may alter the sequence in which content is rendered based on, for example, the amount of time the primary user 444 is predicted to remain in a particular location, the type of content, and/or the primary user's 444 actions/activity. For example, if the content being rendered includes video clips (e.g., a video of an important news event), the system may delay the rendering of that portion of the content until the primary user 444 is in (or predicted to be in) a portion of the environment 400 that includes an appropriate device (e.g., display device 406 in the fourth area 462). Similarly, if the primary user 444 is detected as stopping near and/or gazing towards a device with particular capabilities (e.g., a device with a display screen), the system may then cause content to be rendered that fully utilizes the capabilities of that device (e.g., content that includes video/images).

Figure 7:
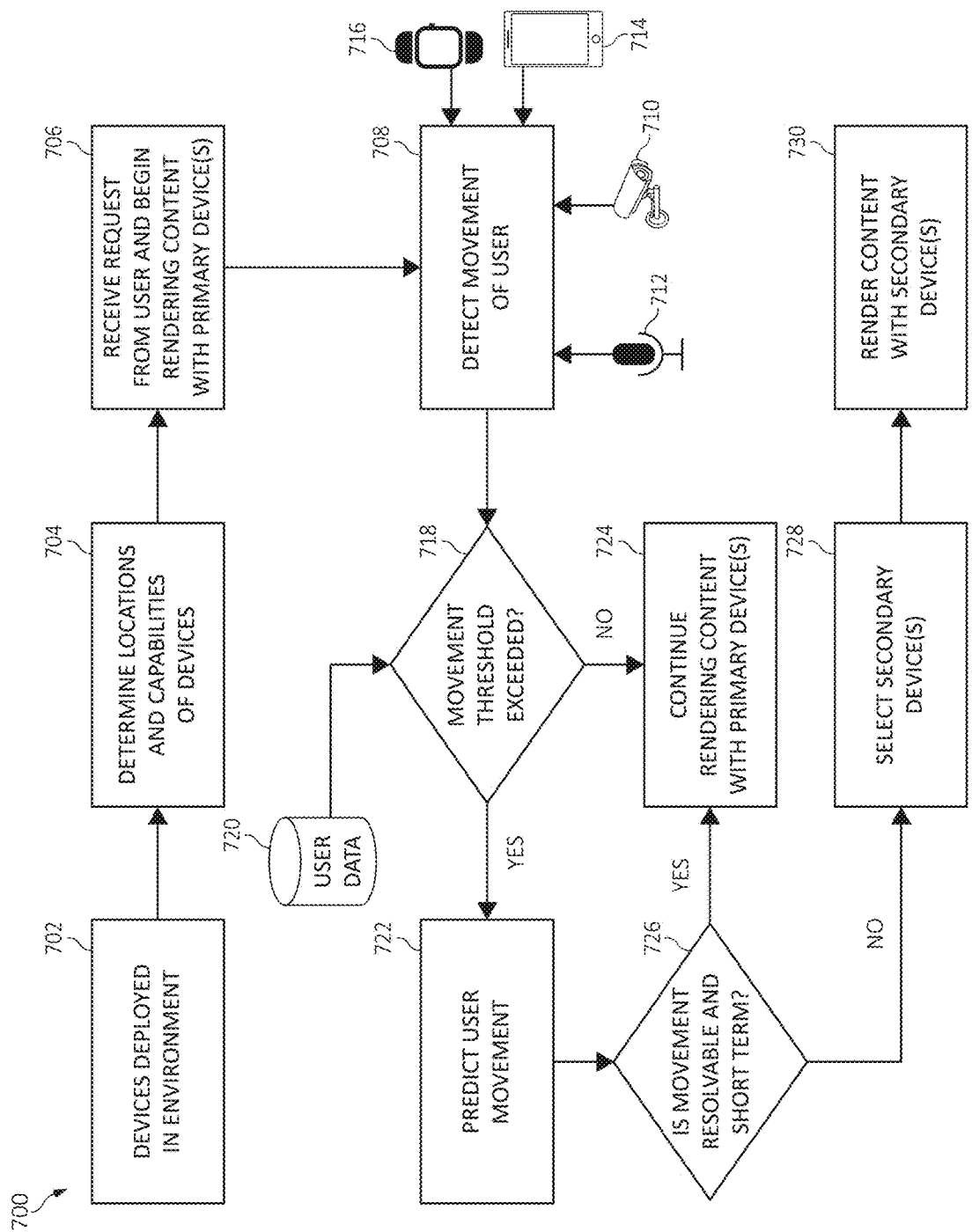
FIG. 7 is a block diagram of a method for managing a virtual assistant according to an embodiment of the present invention.

FIG. 7 is a block diagram of a method (and/or system) 700 for managing virtual assistants, according to an embodiment of the present invention. At block 702, the method begins with a plurality of devices being deployed (or installed) in an environment (e.g., a home, building, office, etc.). The devices may include various sorts of computing and/or IoT devices that are capable of being in operable communication with other devices (e.g., via wireless communication) and rendering audio and/or video content. Examples include, but are not limited to, computing systems/devices (e.g., desktop PCs, mobile electronic devices, etc.), smart televisions, sound systems, appliances (e.g., IoT appliances), etc. Additionally, various types of sensors, such as cameras and/or microphones, may be deployed in the environment, which may be integrated into devices that perform other functions (e.g., a camera and/or microphone integrated with a desktop PC).

At block 704, the locations and capabilities of the devices may be determined. That is, the locations (or relative locations) of the devices within the environment may be determined, along with the capabilities of the devices (e.g., audio and/or video capabilities). Such may be performed via manually entry by a user and/or automatically via, for example, wireless communications, GPS, etc.

At block 706, a request (or command, query, etc.) is received from a user, and in response, the system begins to render content utilizing one or more primary (or first) device (of the available, deployed devices). For example, the user may provide a request (e.g., via voice/speech or text-based methods) to have a particular type of content (or response) rendered when the user is in a first area of the environment. The primary device(s) utilized to render the (first portion of) content may be located in (or near) the first area of the environment.

At block 708, movement of the user (and/or other individuals in the environment) is detected. The movement of the user may be detected utilizing various devices and/or sensors in the environment, such as, for example, cameras 710, microphones 712, mobile phones 714, and smart watches 716. For example, cameras 710 may be utilized to visually/optically detect movement, microphones 712 may be utilized to detect movement via generated sounds (e.g., footsteps), and mobile phones 714 and smart watches 716 may be utilized to detect movement via wireless communication or GPS (e.g., via triangulation).

At block 718, it is determined whether or not the detected movement has exceeded a threshold (e.g., with respect to hearing range/volume and/or line of sight of the primary device(s)). Such a determination may be performed and/or be related to whether or not the user is performing a "substantial" movement to which the system may respond by adjusting the manner in which the content is rendered, as opposed to a minor movement, such as the user taking a few steps in one direction or another. Such may be determined utilizing user data 720, which may include, for example, previous movements of the user (or other individual), profile information associated with the user, etc.

If the movement is determined to exceed the threshold, at block 722, the (future/imminent/subsequent) movement of the user is predicted. Although not specifically shown, the prediction may be based on the user data 720, as described above. If the movement is determined to not exceed the threshold, at block 724, the rendering of the content is continued to be performed (only) with the primary device(s).

At block 726, it is determined whether or not the predicted movement is "resolvable" and "short term." That is, the system may determine whether or not the predicted movement exceeds a threshold (e.g., again with respect to, for example, hearing range and/or line of sight, along with duration) such that the system will adjust the manner in which the content is rendered. If the predicted movement determined to be resolvable and short term, the rendering of the content is continued to be performed with (only) the primary device(s) at block 724 (perhaps in combination with, for example, adjusting the volume at which the content is rendered by the primary device(s)).

However, if the predicted movement is determined to not be resolvable and short term, at block 728, one or more secondary device is selected (i.e., from the devices deployed in the environment). The selection of the secondary device(s) may be based on, for example, the locations of the deployed devices (i.e., compared to the predicted movement of the user), along with the capabilities of the deployed devices.

At block 730, the rendering of the content is switched or transferred to the selected secondary device(s). More particularly, the rendering of the content may be switched such that a second (or other subsequent) portion thereof is rendered by the secondary device(s). As described above, whether or not content is continued to be rendered by the primary device(s) may be based on, for example, the presence and/or movements of, along with other information associated with, other individuals.

Figure 8:
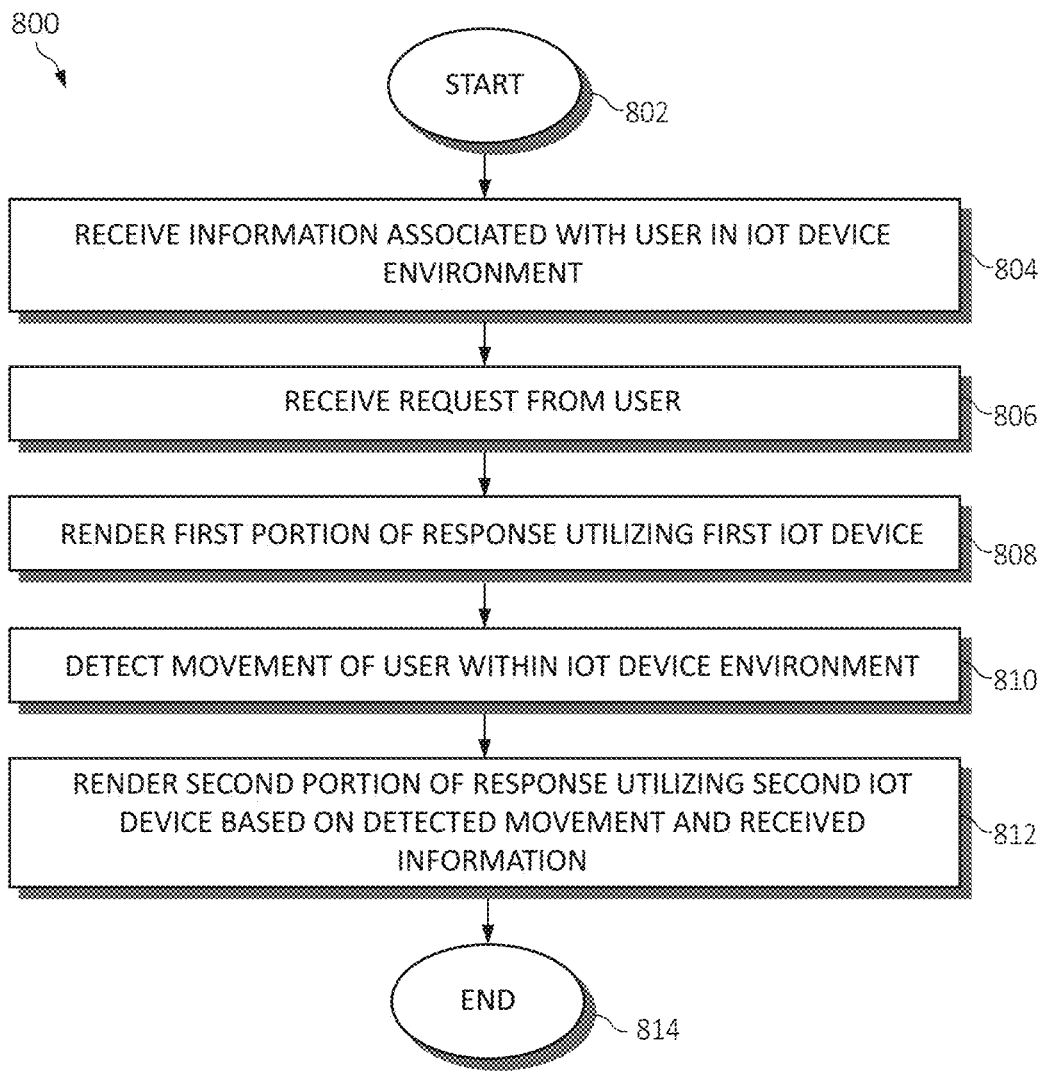
FIG. 8 is a flowchart diagram of an exemplary method for managing a virtual assistant according to an embodiment of the present invention.

Turning to FIG. 8, a flowchart diagram of an exemplary method 800 for managing (or controlling) a virtual assistant, in accordance with various aspects of the present invention, is provided. Method 800 begins (step 802) with, for example, a plurality of devices being deployed (or installed) in an (multiple device or IoT device) environment (e.g., a home, building, office, etc.). The devices may include various sorts of computing and/or IoT devices that are capable of being in operable communication with other devices (e.g., via wireless communication) and rendering audio and/or video content. Examples include, but are not limited to, computing systems/devices (e.g., desktop PCs, mobile electronic devices, etc.), smart televisions, sound systems, appliances (e.g., IoT appliances), etc. Additionally, various types of sensors, such as cameras and/or microphones, may be deployed in the environment, which may be integrated into devices that perform other functions (e.g., a camera and/or microphone integrated with a desktop PC).

Information associated with a user in the IoT device environment is received (step 804). The received information about the user may include previous movements (and/or activity) of the user within the IoT device environment and/or other information, such as profile data (e.g., age, interests, schedules, etc.).

A request is received from the user (step 806). For example, the user may provide the request (or command, query, etc.) via voice/speech or text-based methods.

In response to receiving the request, a first portion of a response to the request is rendered utilizing a first (or first set/group) of the plurality of IoT devices (step 808). The first portion of the response may only be rendered utilizing the first of the plurality of IoT devices (and/or not rendered by any other devices in the environment).

Movement of the user within the IoT device environment is detected (step 810). More particularly, movement of the user after the rendering of the first portion of the response has been initiated may be detected. The movement of the user may be detected utilizing sensors (e.g., a camera and/or microphone) and/or detected movements/positions of computing devices (e.g., via GPS, wireless communication, etc.).

In response to detecting the movement of the user, a second portion of the response to the request is rendered utilizing a second (or second set/group) of the plurality of IoT devices based on the detected movement of the user and the received information about the user (step 812). The rendering of the second portion of the response utilizing the second of the plurality of IoT devices based on the detected movement of the user and the received information may be performed utilizing (and/or based on) a cognitive analysis. In some embodiments, the second portion of the response may only be rendered utilizing the second of the plurality of IoT devices (and/or not rendered utilizing the first of the plurality of IoT devices), depending on the presence and/or activity of other individuals.

For example, the user and a second user may be in a first area of the IoT device environment when the request is received. The detecting of the movement of the user within the IoT device environment may include detecting the user moving from the first area of the IoT device environment to a second area of the IoT device environment. The second portion of the response to the request may be rendered utilizing the first of the plurality of IoT devices after the detecting of the user moving from the first area of the IoT device environment to the second area of the IoT device environment based on information associated with the second user. The information associated with the second user may include at least one of detected activity of the second user and detected movement of the second user during at least one of the receiving of the request from the user and the rendering of the first portion of the response to the request utilizing the first of the plurality of IoT devices.

It may be determined whether each of the first portion of the response to the request and the second portion of the response to the request includes audio content, visual content, or a combination thereof. The first of the plurality of IoT devices and the second of the plurality of IoT devices may be selected to respectively render the first portion of the response to the request and the second portion of the response to the request based on the determining of whether each of the first portion of the response to the request and the second portion of the response to the request includes audio content, visual content, or a combination thereof and characteristics of the first of the plurality of IoT devices and the second of the plurality of IoT devices.

Method 800 ends (step 814) with, for example, the cessation of the rendering of the second portion of the response utilizing the second of the plurality of IoT devices. The process may be repeated when subsequent requests are received. In some embodiments, the user(s) may provide feedback related to the management of the question answering system, which may be utilized by the system to improve performance over time.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for managing a virtual assistant, by one or more processors, comprising:
   receiving information associated with a user in an internet of things (IoT) device environment having a plurality of IoT devices;
   receiving a request from the user;
   in response to the receiving of the request, causing a first portion of a response to the request to be rendered utilizing a first of the plurality of IoT devices;
   detecting movement of the user within the IoT device environment, wherein the detected movements are utilized in a recursive analysis to determine a user path; and
   in response to the detecting of the movement of the user, causing a second portion of the response to the request to be rendered utilizing a second of the plurality of IoT devices based on said detected movement of the user and said received information about the user and the determined user path, wherein, responsive to determining the user is moving along the determined user path, the first of the plurality of IoT devices incrementally increases a volume at which the first portion of the response is rendered based on the detected movements of the user indicating the user is moving further away from the first of the plurality of IoT devices, and the second of the plurality of IoT devices incrementally decreases the volume at which the second portion of the response is rendered based on the detected movements of the user indicating the user is moving toward the second of the plurality of IoT devices, wherein, prior to rendering the first portion of the response to the request, the first of the plurality of IoT devices determines an approximate length of duration the rendering will necessitate to complete the response to the request, and wherein, when the approximate length of duration is under a predetermined threshold, the first of the plurality of IoT devices renders the first portion and the second portion of the response notwithstanding the movement of the user is detected.

2. The method of claim 1, wherein said received information about the user includes previous movements of the user within the IoT device environment.

3. The method of claim 2, wherein the causing of the second portion of the response to be rendered utilizing the second of the plurality of IoT devices is performed utilizing a cognitive analysis.

4. The method of claim 1, wherein the first portion of the response is only rendered utilizing the first of the plurality of IoT devices, and the second portion of the response is only rendered utilizing the second of the plurality of IoT devices.

5. The method of claim 1, wherein the user and a second user are in a first area of the IoT device environment when the request is received, and wherein the detecting of the movement of the user within the IoT device environment includes detecting the user moving from the first area of the IoT device environment to a second area of the IoT device environment, and further comprising causing the second portion of the response to be rendered utilizing the first of the plurality of IoT devices after the detecting of the user moving from the first area of the IoT device environment to the second area of the IoT device environment based on information associated with the second user.

6. The method of claim 5, wherein the information associated with the second user includes at least one of detected activity of the second user and detected movement of the second user during at least one of the receiving of the request from the user and the causing of the first portion of the response to be rendered utilizing the first of the plurality of IoT devices.

7. The method of claim 1, further comprising:
determining if each of the first portion of the response and the second portion of the response includes audio content, visual content, or a combination thereof; and
selecting each of the first of the plurality of IoT devices and the second of the plurality of IoT devices to respectively render the first portion of the response and the second portion of the response based on the determining if each of the first portion of the response and the second portion of the response includes audio content, visual content, or a combination thereof and characteristics of the first of the plurality of IoT devices and the second of the plurality of IoT devices.

8. A system for managing a virtual assistant comprising:
a processor executing instructions stored in a memory device, wherein the processor:
receives information associated with a user in an internet of things (IoT) device environment having a plurality of IoT devices;
receives a request from the user;
in response to the receiving of the request, causes a first portion of a response to the request to be rendered utilizing a first of the plurality of IoT devices;
detects movement of the user within the IoT device environment, wherein the detected movements are utilized in a recursive analysis to determine a user path; and
in response to the detecting of the movement of the user, causes a second portion of the response to the request to be rendered utilizing a second of the plurality of IoT devices based on said detected movement of the user and said received information about the user and the determined user path, wherein, responsive to determining the user is moving along the determined user path, the first of the plurality of IoT devices incrementally increases a volume at which the first portion of the response is rendered based on the detected movements of the user indicating the user is moving further away from the first of the plurality of IoT devices, and the second of the plurality of IoT devices incrementally decreases the volume at which the second portion of the response is rendered based on the detected movements of the user indicating the user is moving toward the second of the plurality of IoT devices, wherein, prior to rendering the first portion of the response to the request, the first of the plurality of IoT devices determines an approximate length of duration the rendering will necessitate to complete the response to the request, and wherein, when the approximate length of duration is under a predetermined threshold, the first of the plurality of IoT devices renders the first portion and the second portion of the response notwithstanding the movement of the user is detected.

9. The system of claim 8, wherein said received information about the user includes previous movements of the user within the IoT device environment.

10. The system of claim 9, wherein the causing of the second portion of the response to be rendered utilizing the second of the plurality of IoT devices is performed utilizing a cognitive analysis.

11. The system of claim 8, wherein the first portion of the response is only rendered utilizing the first of the plurality of IoT devices, and the second portion of the response is only rendered utilizing the second of the plurality of IoT devices.

12. The system of claim 8, wherein the user and a second user are in a first area of the IoT device environment when the request is received, and wherein the detecting of the movement of the user within the IoT device environment includes detecting the user moving from the first area of the IoT device environment to a second area of the IoT device environment, and wherein the processor further causes the second portion of the response to be rendered utilizing the first of the plurality of IoT devices after the detecting of the user moving from the first area of the IoT device environment to the second area of the IoT device environment based on information associated with the second user.

13. The system of claim 12, wherein the information associated with the second user includes at least one of detected activity of the second user and detected movement of the second user during at least one of the receiving of the request from the user and the causing of the first portion of the response to be rendered utilizing the first of the plurality of IoT devices.

14. The system of claim 8, wherein the processor further:
  determines if each of the first portion of the response and the second portion of the response includes audio content, visual content, or a combination thereof; and
  selects each of the first of the plurality of IoT devices and the second of the plurality of IoT devices to respectively render the first portion of the response and the second portion of the response based on the determining if each of the first portion of the response and the second portion of the response includes audio content, visual content, or a combination thereof and characteristics of the first of the plurality of IoT devices and the second of the plurality of IoT devices.

15. A computer program product for managing a virtual assistant, by one or more processors, the computer program product embodied on a non-transitory computer-readable storage medium having computer-readable program code portions stored therein, the computer-readable program code portions comprising:
  an executable portion that receives information associated with a user in an internet of things (IoT) device environment having a plurality of IoT devices;
  an executable portion that receives a request from the user;
  an executable portion that, in response to the receiving of the request, causes a first portion of a response to the request to be rendered utilizing a first of the plurality of IoT devices;
  an executable portion that detects movement of the user within the IoT device environment, wherein the detected movements are utilized in a recursive analysis to determine a user path; and
  an executable portion that, in response to the detecting of the movement of the user, causes a second portion of the response to the request to be rendered utilizing a second of the plurality of IoT devices based on said detected movement of the user and said received information about the user and the determined user path, wherein, responsive to determining the user is moving along the determined user path, the first of the plurality of IoT devices incrementally increases a volume at which the first portion of the response is rendered based on the detected movements of the user indicating the user is moving further away from the first of the plurality of IoT devices, and the second of the plurality of IoT devices incrementally decreases the volume at which the second portion of the response is rendered based on the detected movements of the user indicating the user is moving toward the second of the plurality of IoT devices, wherein, prior to rendering the first portion of the response to the request, the first of the plurality of IoT devices determines an approximate length of duration the rendering will necessitate to complete the response to the request, and wherein, when the approximate length of duration is under a predetermined threshold, the first of the plurality of IoT devices renders the first portion and the second portion of the response notwithstanding the movement of the user is detected.

16. The computer program product of claim 15, wherein said received information about the user includes previous movements of the user within the IoT device environment.

17. The computer program product of claim 16, wherein the causing of the second portion of the response to be rendered utilizing the second of the plurality of IoT devices is performed utilizing a cognitive analysis.

18. The computer program product of claim 15, wherein the first portion of the response is only rendered utilizing the first of the plurality of IoT devices, and the second portion of the response is only rendered utilizing the second of the plurality of IoT devices.

19. The computer program product of claim 15, wherein the user and a second user are in a first area of the IoT device environment when the request is received, and wherein the detecting of the movement of the user within the IoT device environment includes detecting the user moving from the first area of the IoT device environment to a second area of the IoT device environment, and wherein the computer-readable program code portions further include an executable portion that causes the second portion of the response to be rendered utilizing the first of the plurality of IoT devices after the detecting of the user moving from the first area of the IoT device environment to the second area of the IoT device environment based on information associated with the second user.

20. The computer program product of claim 19, wherein the information associated with the second user includes at least one of detected activity of the second user and detected movement of the second user during at least one of the receiving of the request from the user and the causing of the first portion of the response to be rendered utilizing the first of the plurality of IoT devices.

21. The computer program product of claim 15, wherein the computer-readable program code portions further include:
  an executable portion that determines if each of the first portion of the response and the second portion of the response includes audio content, visual content, or a combination thereof, and
  an executable portion that selects each of the first of the plurality of IoT devices and the second of the plurality of IoT devices to respectively render the first portion of the response and the second portion of the response based on the determining if each of the first portion of the response and the second portion of the response includes audio content, visual content, or a combination thereof and characteristics of the first of the plurality of IoT devices and the second of the plurality of IoT devices.

\* \* \* \* \*